Dec. 6, 1960    H. K. BROWN ET AL    2,963,120
BRAKE RIGGING
Filed Sept. 8, 1955    2 Sheets-Sheet 1
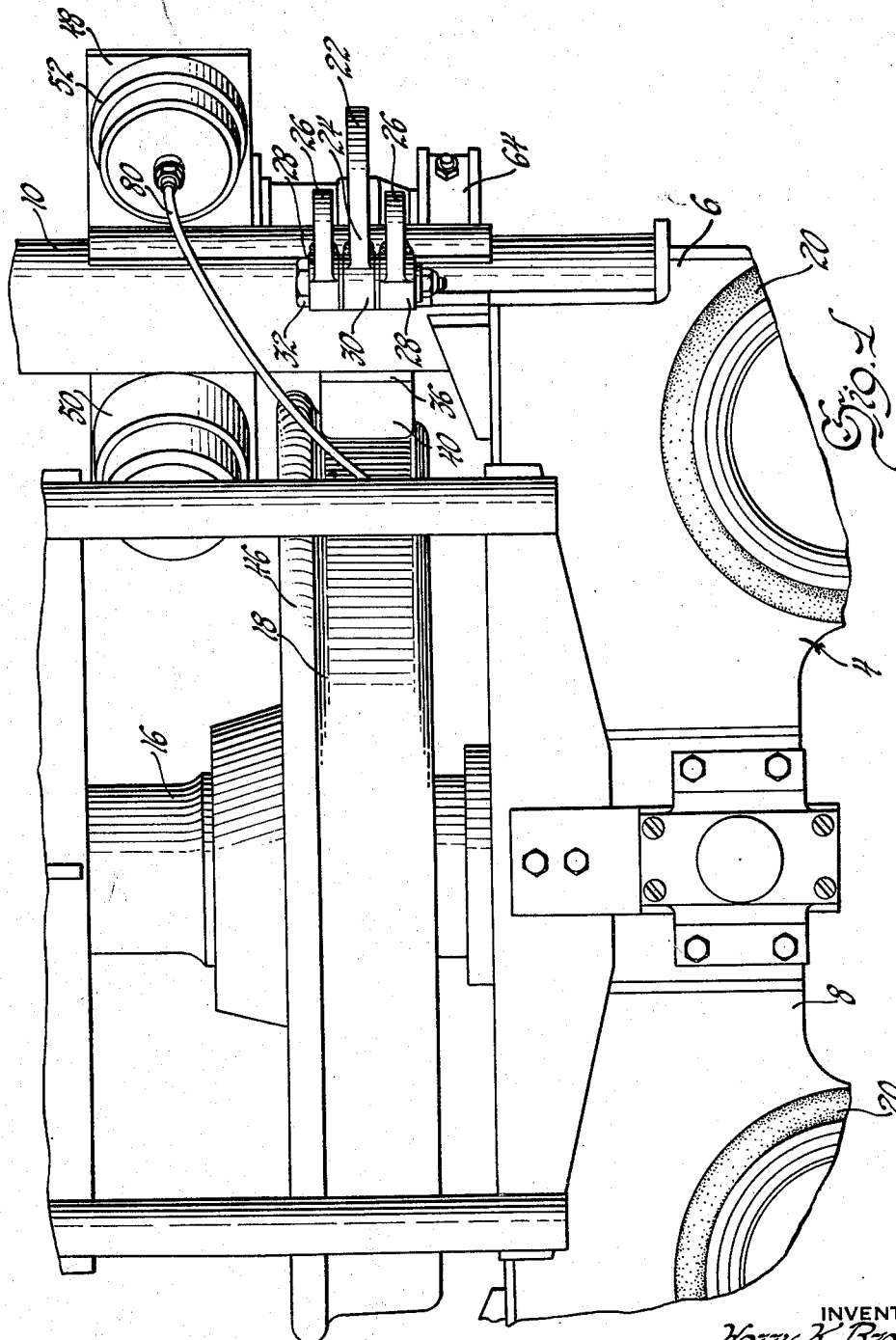
INVENTORS
Harry K. Brown &
BY John Markestein
J. C. Thorpe
ATTORNEY

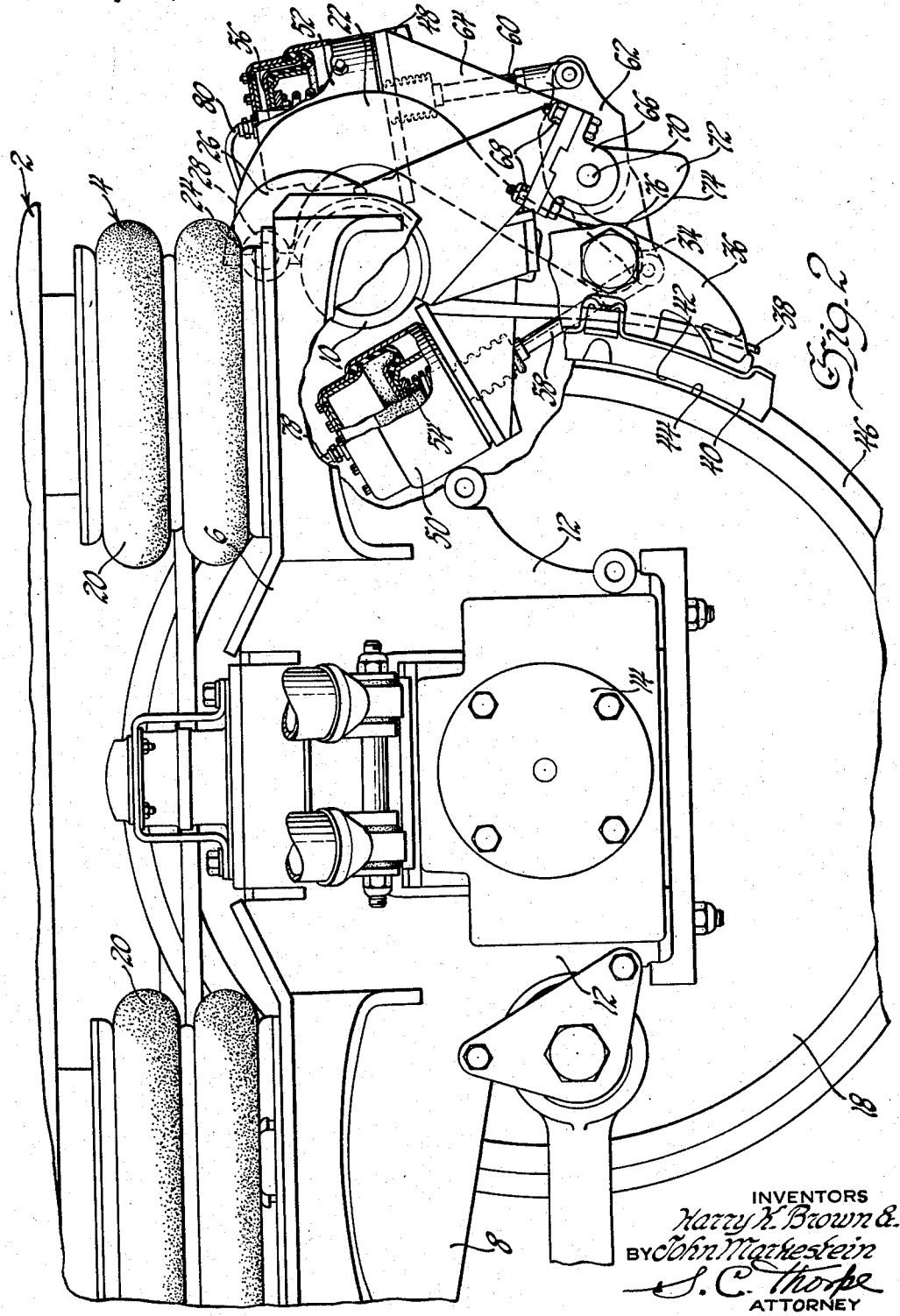

United States Patent Office 2,963,120
Patented Dec. 6, 1960

2,963,120

BRAKE RIGGING

Harry K. Brown, Downers Grove, and John Markestein, Westchester, Ill., assignors to General Motors Corporation, Detroit, Mich., a corporation of Delaware Filed Sept. 8, 1955, Ser. No. 533,066

3 Claims. (Cl. 188—153)

This invention relates generally to brakes and more specifically to brake rigging particularly adapted for use with railway vehicles.

It has been the practice over the years to provide railway vehicles with fluid-operated brakes wherein the fluid used is air. It has been found that in order to get the proper response for the length of an entire train it is best to provide individual brake riggings on each of the cars of the train and to have these brakes applied by a release of pressure as opposed to an increase in pressure such as is used in automotive vehicles. The reason for using released air pressure to apply the brakes is in that way the individual cars making up the train may be provided with reservoirs which are charged during normal running operation of the train so that when the brakes are applied there is a local source of air pressure for each car which enables the brakes to be applied more rapidly. It is primarily for a modification of such systems that the present invention has been devised.

It has been proposed in a recently innovated system of the type described above to use two opposing cylinders to apply and release the brakes for each individual wheel of the railway vehicle. One of the cylinders is to be maintained charged at a relatively constant pressure and the pressure in the other cylinder varied to apply and release the brakes. Normally, equal pressures in the new system are to be provided to the two brake cylinders when the brakes are released and the train is in the so-called "running" condition, i.e., being powered or coasting along the rails. The advantages of using two cylinders in opposition to each other are manifold. One such advantage is that when the brake shoes become removed from the wheels as air pressure equalizes in the brake cylinders the brakes are released and the rigging itself is actually cushioned between or on these two air cylinders so as to prevent rattling, etc. The use of opposing cylinders, however, raises certain problems which must be first overcome before such a proposed system can be practical. One of these problems is that if equal air pressures are contained in the cylinders, when one of the cylinders is exhausted wholly or in part to apply the brakes, the restoring of normal pressure to that cylinder while it will no longer allow any positive forces of the other cylinder to apply the brakes will not actually allow the rigging to move away from the wheels in the desired manner. Secondly and also quite important is the fact that these cylinders are operatively connected to the brake shoes by linkages whose actions cause changes in the leverages applied which unless compensated for will prevent the operator from smoothly applying the brakes at a uniform rate.

The present invention provides a solution for the first of these problems with a unique mechanical linkage which is so arranged that when equal pressures are applied to the two similar cylinders to release the brakes when the brakes are in their applied position, opposing unequal torques will be applied to a shaft which is operable to apply and release the brakes. These unequal torques will cause the shaft to turn to thereby allow the brake shoes to be removed from the wheel. The levers and the connections to the piston assemblies of the cylinders are further arranged so that after a predetermined movement of the shoes away from the wheels the opposing torques applied to the shaft by the lever and the piston assembly connected thereto become equal as long as the pressures in the cylinders are substantially the same.

The second problem, i.e., the difficulty of applying equal increasing brake forces by the operator, is solved by a unique linkage which includes a cam secured to the aforementioned shaft engageable with the brake shoe for camming the shoe into engagement with the wheel whose cam surface is of unique configuration to compensate for the changes in the torque applied to the shaft by the release cylinder.

From the foregoing it will be apparent that one of the objects of this invention is to provide a unique mechanical brake linkage in combination with a pair of opposed brake cylinders wherein one of the cylinders is maintained at a relatively constant pressure and the pressure of the other cylinder is varied to apply and release the brakes.

It is a further object of this invention to provide, in combination with a pair of opposed brake cylinders wherein one of the cylinders is maintained at a relatively constant pressure and the pressure of the other cylinder is varied to apply and release the brakes, a unique linkage which when the pressures in the cylinders are equal and the shoes are applied to the brakes will enable the shoes to move away from the brakes and which after the brake shoes have moved a predetermined amount away from the wheels will hold these shoes at this predetermined distance from the shoes operatively balanced by equal pressures in the two cylinders.

It is a still further object of this invention to provide a unique linkage including a cam which compensates for the eccentric movements of the brake applying levers and the piston assemblies connected thereto.

For further objects and a fuller understanding of this invention reference may be had to the accompanying detailed description and drawings, in which:

Fig. 1 is a view in plan of a portion of the truck of a railway vehicle showing the relative location of the cylinder assemblies, the brake shoe, and the brake hanger of the new brake rigging.

Fig. 2 is a side elevation with parts broken away and in section to illustrate various details of the novel brake linkage and how it has been uniquely combined with opposing brake cylinders.

Referring now to the Figures 1 and 2, the end of a railway vehicle is shown as being indicated generally by a numeral 2. The end of the railway vehicle is supported by a truck assembly indicated generally by a numerral 4. The trruck assembly 4 comprises a truck frame 6 made up of longitudinally extending, transversely spaced air bellows frame members 8 which are secured together by means of transversely extending rods or bars 10. The members 8 include wheel pieces or pedestals 12 between which are mounted journal box assemblies 14. The journal box assemblies 14 journal for rotation therein the ends of an exle 16 on which the usual railway vehicle wheels 18 are pressed. The end 2 of the vehicle is supported by the longitudinally extending frame members 8 through the medium of the air bellows 20.

The new brake rigging is mounted on the frame 6 so as to move vertically with the wheels 18. This rigging comprises a vertical brake hanger 22 whose upper end 24 is pivotally fastened to the frame 6 by means of brackets 26 fixed to the transverse rods 10. These brackets 26 have welded, or otherwise secured, thereto bearings 28. A bearing 30 fixed to the upper end 24 is pivotally secured between bearings 28 by means of a bolt 32 extending through bearings 28 and 30 so that the lever 22 can swing in the plane of the wheel 18. The lower end 34 of the lever 22 has pivotally fastened thereto a brake head 36 to which is secured by means of the usual key 38 a brake shoe 40. The shoe 40 has a braking surface 42 theron which is adapted to engage the cylindrical outwardly facing surface of the wheel 18 adjacent the flange 46 thereof. Mounted on the transverse rods 10 inboard of the wheel 18 by means of a unique bracket 48, welded or otherwise suitably fixed thereto, are two angularly located brake cylinders 50 and 52. The cylinders 50 and 52 which are of conventional design are the same and include the usual fluid-actuated piston assemblies 54 and 56 which are connected by means of rods 58 and 60 to opposite arms of a unique composite brake actuating lever 62 which will be described in more detail shortly.

Also connected to the transverse rod by means of bracket 64, welded or otherwise suitably fixed thereto, is a bearing 66 which is fastened to the bracket 64 by means of bolt and nut assemblies 68. The bearing 66 journals one end of a shaft 70 to which is fastened for rotation therewith a unique cam 72 having a cam surface 74 engageable with an abutting surface 76 on the brake head 36. The opposite end of the shaft 70 is secured to the composite lever assembly 62 so that rotative movement of these levers 62 will cause rotation of shaft 70. As best observed in Fig. 2, the ends of the rods 58 and 60 are pivotally secured to the opposite ends of lever 62 with the arm of lever 62 connected to rod 58 being slightly longer than the arm of lever 62 connected to rod 60.

As mentioned, these brake cylinders are adapted to be connected to an air pressure source via a brake control system so that the pressure in the cylinder 52 is maintained relatively constant through a check valve (not shown) and the pressure in the cylinder 50 may be varied to apply and release the brakes. The connections for supplying the air to cylinders 50 and 52 in this manner are shown at 78 and 80.

The operation of the rigging is as follows: Assuming it is desired to apply the brakes and the pressures in the cylinders 50 and 52 are the same, the engineer would operate his control to release air from cylinder 50 through conduit 78. This will cause a substantial unbalance between the air pressures in the cylinders 50 and 52 (since the air pressure charge in 52 is always the same or substantially the same) and cause the piston assembly 56 of cylinder 52 to move downwardly causing rotation of lever 62 and shaft 70 and cam 72 in a clockwise direction as viewed in Fig. 2. The surface 74 of cam 72 abutting the surface 76 on the brake head 36 will cause the brake head 36 to move toward the wheel 18 and the surface 42 of the brake shoe 40 to engage the brake wheel surface 44 thereby achieving braking. As the lever 62 rotates with the shaft 70, however, its effective lever arms change which results in changes in the torque applied to shaft 70. This change, however, is compensated for by the shape of the cam surface 74 so that uniform braking pressures are applied to the wheel 18 by uniform reductions in the pressures in the cylinder 50. To release the brakes the engineer operates his controls so that air pressure is supplied to the cylinder 50 at the same pressure as in cylinder 52. While supplying this pressure to cylinder 50 removes the braking forces applied to the wheel 18 by the shoe 42, it will not necessarily cause the cam to move so as to return the shoe to its predetermined disengaged position from the wheel. However, because of the fact that a certain mechanical advantage is obtained by the relative lengths and angularity of the arms of the lever 62 in relation to the axis of the shaft 70, a torque is provided which is in opposition to and greater for certain positions of shaft 70 than the torque applied by the cylinder 52. Because of this unbalance in the torques applied to shaft 70 it will be rotated counterclockwise as viewed in the drawing until the shoe reaches its predetermined released position at which time the opposing torques applied by cylinders 50 and 52 and by the arms of the levers 62 to the shaft 70 will be equal.

From the above it may now be appreciated that a unique brake rigging including brake actuating linkages has been provided in combination with brake actuating cylinders which positively removes the braking action upon release of the brakes to return the shoes to a predetermined released position and which uniformly applies the brakes upon uniform operation of the brakes by the operator.

What we claim is:

1. In a brake rigging including a brake applying shaft operable to apply and release the brakes of said rigging, a bellcrank lever having arms unequal in length fixed to said shaft operable to turn said shaft, a pair of brake cylinders including fluid-actuated piston assemblies connected to the arms of said lever and acting in opposition to each other, said lever and the connections of said piston assemblies thereto being arranged to provide unequal opposing torques to said shaft when the brakes of said rigging are in the application position and the pressures in said cylinders are equal, and equal opposing torques to said shaft when the brakes of said rigging are in the released position.

2. In a brake rigging for a railway vehicle including a wheel support and a wheel, a shoe hung from said support adjacent said wheel, a shaft journaled on said support, a cam secured to said shaft and engaging said shoe to cam said shoe into said wheel, a lever fixed on said shaft and having arms of unequal length from the axis thereof operable to turn said shaft, a pair of brake cylinders including fluid-actuated piston assemblies operatively connected to the arms of said lever so that unequal moments are applied to said shaft when in the shoe application position and the pressures in said cylinders are equal and equal moments are applied to said shaft when in the shoe release position.

3. In a railway vehicle in combination, a frame including wheel pieces, an axle journaled for rotation between said pieces, a wheel mounted on said axle, a brake shoe hung fom said frame adjacent said wheel, a shaft journaled on said frame, a cam on said shaft engageable with said shoe, a pair of unequal arms of unequal length connected to said shaft operable to turn and to apply a moment to said shaft to apply said shoe to and release said shoe from said wheel, at least two brake cylinders including fluid-actuated piston assemblies each connected to one of said arms so as to act in opposition to each other, said cam cooperating with said shoe to compensate for changes in the moment caused by the change in angle between the arms and the axes of the pistons when actuated to apply said shoe to said wheel and release said shoe from said wheel.

References Cited in the file of this patent

UNITED STATES PATENTS

| | | |
|---|---|---|
| 773,190 | Brown | Oct. 25, 1904 |
| 774,892 | Pedersen | Nov. 15, 1904 |
| 1,674,378 | Snyder | June 19, 1928 |
| 1,696,985 | Trbojevich | Jan. 1, 1929 |
| 2,726,738 | Fawick | Dec. 13, 1955 |